United States Patent [19]

Kaneda et al.

[11] Patent Number: 5,156,764
[45] Date of Patent: Oct. 20, 1992

[54] PHOSPHOR

[75] Inventors: Hideaki Kaneda, Yokohama; Yuji Takatuka, deceased, late of Odawara, by Takuji Takatuka, legal representative; Takashi Hase, Ebina, all of Japan

[73] Assignee: Kasei Optonix, Ltd., Tokyo, Japan

[21] Appl. No.: 746,100

[22] Filed: Aug. 12, 1991

Related U.S. Application Data

[63] Continuation of Ser. No. 458,402, Dec. 18, 1989, abandoned.

[30] Foreign Application Priority Data

Dec. 28, 1988 [JP] Japan .................. 63-329083

[51] Int. Cl.$^5$ ............................................. C09K 11/81
[52] U.S. Cl. ............................................. 252/301.4 P
[58] Field of Search ............................... 252/301.4 P

[56] References Cited

U.S. PATENT DOCUMENTS 3,634,282   1/1972   Denis et al. .................. 252/301.4 P

FOREIGN PATENT DOCUMENTS 52-75673   6/1977   Japan .................. 252/301.4 P

OTHER PUBLICATIONS

Agrawal et al. "J. Electrochem Soc.", 1986, 133(6) pp. 1261–1265.
Patent Abstracts of Japan, vol. 13, No. 79, Feb. 1989 Toshiba.
Patent Abstracts of Japan, vol. 13, No. 72, Feb. 1989 Kasei Optonix.

*Primary Examiner*—Jack Cooper
*Attorney, Agent, or Firm*—Oblon, Spivak, McClelland, Maier & Neustadt

[57] ABSTRACT

A trivalent metal phosphate phosphor having a composition of the formula:

$$(Ln_{1-x}Ln'_x)_3PO_7 \qquad (I)$$

wherein Ln is at least one member selected from the group consisting of yttrium, lanthanum, gadolinium and lutetium, Ln' is at least one member selected from the group consisting of terbium, cerium, europium, praseodymium, samarium, dysprosium, erbium, thulium and holmium, and x is a number satisfying $0.0001 \leq x \leq 0.5$.

3 Claims, 5 Drawing Sheets

PHOSPHOR

This application is a continuation of application Ser. No. 07/458,402, filed on Dec. 18, 1989, now abandoned.

The present invention relates to a novel phosphor. More particularly, it relates to a trivalent metal phosphate phosphor, whereby emission of various colors with high luminance can be obtained by using certain specific activators.

Heretofore, as trivalent metal phosphate phosphors having rare earth elements as activators, $(Ln_{1-x}Ln'_x)PO_4$ wherein Ln is yttrium, gadolinium or lanthanum and Ln' is europium, terbium, samarium, dysprosium, praseodymium, neodymium, ytterbium, holmium and erbium [R. C. Roop, J. Electrochem. Soc. 115, 8, 841 (1968)], (Ln,Ce)PO$_4$ wherein Ln is yttrium, gadolinium or lanthanum [R. C. Roop, J. Electrochem. Soc. 115, 5, 531 (1968)], (La,Ce,Tb)PO$_4$ [J. C. Bourcet et. al., Rare Earth Research Conf. 441 (1971)], $(La_{1-x}Gd_x)P_3O_9$:Ce,Tb [H. S. Kiliaan et. al., J. Solid State Chem. 74, 1, 39 (1988)]. Among these known phosphors, the LnPO$_4$ system is a rare earth orthophosphate and a crystal matrix having a monazite structure (Ln': e.g. lanthanum, gadolinium) or a zenotime structure (Ln': e.g. yttrium), and the Ln'P$_3$O$_9$ system is a rare earth methaphosphate.

The above-mentioned conventional rare earth-activated phosphors are known to show emissions corresponding to the respective activating rare earth elements under excitation by various means such as ultraviolet rays, electron beams, X-rays or vacuum ultraviolet rays. Some of them have already been practically used for certain specific purposes. However, from the practical viewpoint, phosphors having higher emission luminance than these phosphors are desired.

Accordingly, it is an object of the present invention to provide a novel phosphate phosphor showing an emission with higher luminance than the conventional rare earth phosphate phosphors.

In order to accomplish the above object, the present inventors have conducted a research for a rare earth phosphate type matrix suitable for activating various rare earth elements. As a result, they have found that when a Ln$_3$PO$_7$ rare earth phosphate is used as a matrix which is different from the conventional LnPO$_4$ (Ln: as defined above) rare earth orthophosphate or LnP$_3$O$_9$ (Ln: as defined above) rare earth methaphosphate matrix, and a suitable amount of a rare earth is activated to this matrix, it is possible to obtain a phosphor showing an emission with high luminance under excitation by ultraviolet rays, electron beams, X-rays or vacuum ultraviolet rays, particularly, a phosphor showing an emission corresponding to each activating rare earth element with high luminance under excitation by ultraviolet rays and vacuum ultraviolet rays. The present invention has been accomplished on the basis of this discovery.

Thus, the present invention provides a trivalent metal phosphate phosphor having a composition of the formula:

$(Ln_{1-x}Ln'_x)_3PO_7$ (I)

wherein Ln is at least one member selected from the group consisting of yttrium, lanthanum, gadolinium and lutetium, Ln' is at least one member selected from the group consisting of terbium, cerium, europium, praseodymium, samarium, dysprosium, erbium, thulium and holmium, and x is a number satisfying $0.0001 \leq x \leq 0.5$.

With the above-mentioned rare earth-activated orthophosphate phosphor or methaphosphate phosphor, it has been difficult to obtain an efficient emission under excitation by ultraviolet rays (e.g. 254 nm) when e.g. terbium (Tb) is used alone as the activator. Therefore, it used to be necessary to increase the efficiency by using cerium (Ce) as a coactivator. The phosphor of the present invention is a novel phosphor showing an emission equal or higher even by a single use of Tb than the LnPO$_4$:Ce,Tb phosphor, such as a LaPO$_4$:Ce,Tb phosphor, which is presently practically used.

Now, the present invention will be described in detail with reference to the preferred embodiments.

In the accompanying drawings.

Figure 1:
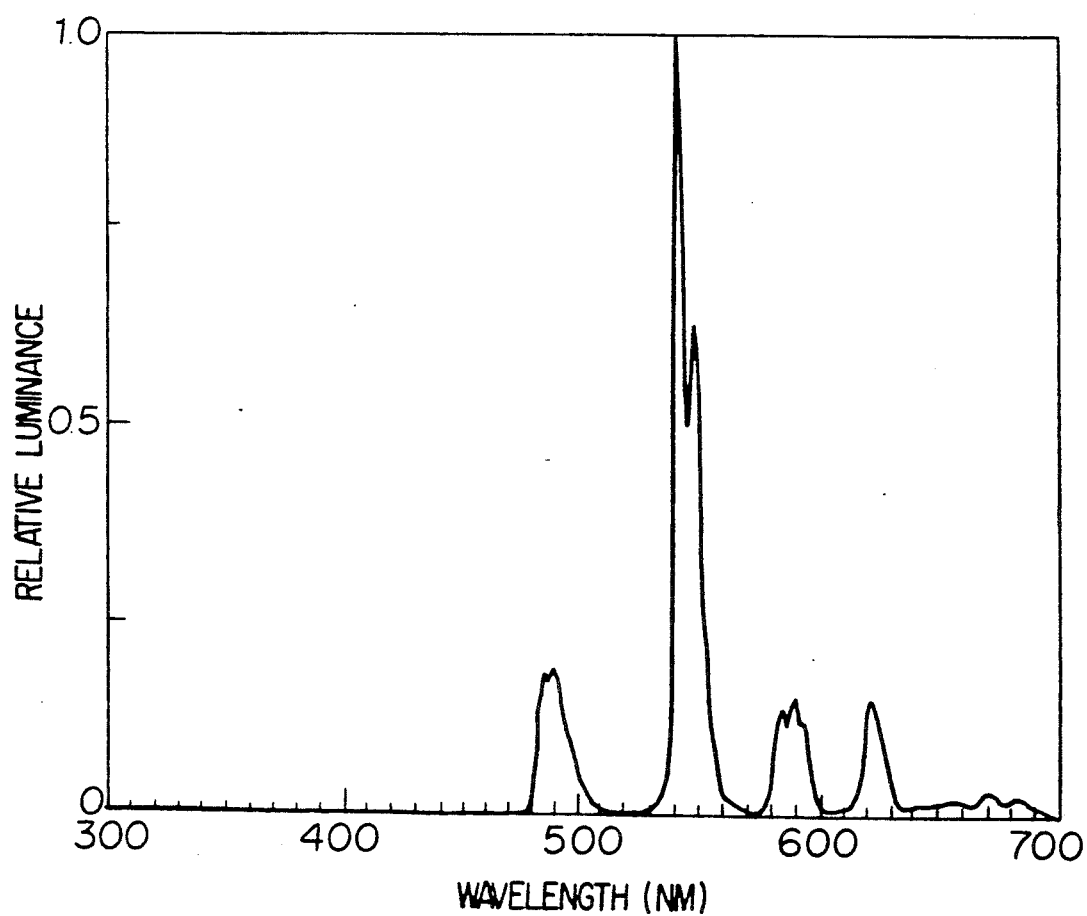
FIG. 1 is the emission spectrum of the $(Y_{0.9}Tb_{0.1})_3PO_7$ phosphor (Example 1) of the present invention.

The phosphor of the present invention having a composition of the formula I is produced by the following method.

Firstly, as the raw materials for the phosphor, (a) at least one compound selected from a group of compounds consisting of a first group of compounds consisting of yttrium oxide (Y$_2$O$_3$), lanthanum oxide (La$_2$O$_3$), gadolinium oxide (Gd$_2$O$_3$) and lutetium oxide (Lu$_2$O$_3$) and a second group of compounds consisting of yttrium compounds, lanthanum compounds, gadolinium compounds and lutetium compounds which are capable of being readily converted to Y$_2$O$_3$, La$_2$O$_3$, Gd$_2$O$_3$ and Lu$_2$O$_3$, respectively, at high temperatures, (b) at least one compound selected from a group of compounds consisting of a first group of compounds consisting of terbium oxide (Tb$_4$O$_7$), cerium oxide (CeO$_2$), europium oxide (Eu$_2$O$_3$), praseodymium oxide (Pr$_6$O$_{11}$), samarium oxide (Sm$_2$O$_3$), dysprosium oxide (Dy$_2$O$_3$), erbium oxide (Er$_2$O$_3$), thulium oxide (Tm$_2$O$_3$) and holmium oxide (Ho$_2$O$_3$) and a second group of compounds consisting of terbium compounds, cerium compounds, europium compounds, praseodymium compounds, samarium compounds, dysprosium compounds, erbium compounds, thulium compounds and holmium compounds which are capable of being readily converted to Tb$_4$O$_7$, CeO$_2$, Eu$_2$O$_3$, Pr$_6$O$_{11}$, Sm$_2$O$_3$, Dy$_2$O$_3$, Er$_2$O$_3$, Tm$_2$O$_3$ and Ho$_2$O$_3$, respectively, at high temperatures, and (c) at least one compound selected from a group of compounds consisting of a first group of compounds consisting of ammonium primary phosphate ((NH$_4$)H$_2$PO$_4$) and ammonium secondary phosphate ((NH$_4$)$_2$HPO$_4$) and a second group of compounds capable of being readily converted to a phosphoric acid source at high temperatures, may be used, or (a) co-precipitated oxides of at least one member selected from the group consisting of yttrium, lanthanum, gadolinium and lutetium and at least one member selected from the group consisting of terbium, cerium, europium, praseodymium, samarium, dysprosium, erbium, thulium and holmium, and (b) at least one compound selected from a group of compounds consisting of a first group of compounds consisting of ammonium primary phosphate ((NH$_4$)H$_2$PO$_4$) and ammonium secondary phosphate $((NH_4)_2HPO_4)$ and a second group of compounds capable of being readily converted to a phosphoric acid source at high temperatures, may be employed.

(c) When magnesium is incorporated as the case requires, at least one compound selected from the group of compounds consisting of a first group of compounds consisting of magnesium chloride ($MgCl_2.6H_2O$), magnesium hydroxide [$Mg(OH)_2$], magnesium nitrate [$Mg(NO_3)_2.6H_2O$] and magnesium carbonate ($MgCO_3$) and a second group of magnesium compounds which can readily be converted to MgO at high temperatures, may be employed.

The above raw materials, and accordingly the resulting phosphors, may contain a very small amount at a level of from 10 to 1,000 ppm of antimony, tin, lead or zinc; a monovalent metal such as lithium, sodium or potassium; a divalent metal such as calcium, barium or strontium; bismuth, silicon, hafnium, zirconium or indium, for the purpose of improving the luminance or the useful life of the phosphors.

The above phosphor raw materials are weighed in the respective amounts required to satisfy the compositional formula:

$$(Ln_{1-x}Ln'_x)_3PO_7$$

wherein Ln, Ln' and x are as defined above, or in the case where magnesium is incorporated, to satisfy the compositional formula:

$$(Ln_{1-x}Ln'_x)_3PO_7.aMg_3(PO_4)_2$$

wherein Ln, Ln' and x are as defined above, and a is a number satisfying $0 \leq a \leq 1$, and thoroughly mixed. The mixing may be conducted in a dry system by means of a ball mill, a mixer mill or a mortar, or in a wet system in a paste state by means of water or like as a medium.

Then, the mixture of phosphor raw materials is filled in a heat resistant vessel such as an alumina crucible or quartz crucible, followed by firing. The firing is conducted once or twice at a temperature of from about 500° to 1,700° C. in air, in a neutral atmosphere such as an argon gas atmosphere or a nitrogen gas atmosphere or in a reducing atmosphere such as a nitrogen gas atmosphere or a carbon dioxide atmosphere containing a small amount of hydrogen gas. When the firing is conducted twice, the phosphor mixture is returned to room temperature after completion of the first firing, then pulverized, if necessary, and then fired again.

In the firing, in order to certainly change the valence of the activator such as terbium to trivalent, it is preferred to conduct at least the final firing (i.e. the first firing when the firing is conducted only once) in a neutral or reducing atmosphere. The firing time varies depending upon e.g. the weight of the mixture of phosphor raw materials filled in the heat resistant vessel, but is usually within a range of from 2 to 5 hours within the above-mentioned firing temperature range. To facilitate the reaction during the firing, an alkali metal compound or a boron compound may be used as a flux, whereby the firing can be conducted at a lower temperature in a shorter period of time, and the emission properties may thereby be improved.

After firing, the obtained fired product is subjected to various treatments which are commonly employed for the preparation of phosphors, such as pulverization, washing, drying and sieving, to obtain a phosphor of the present invention.

The phosphor of the present invention shows a blue to red emission of high luminance under excitation by ultraviolet rays, electron beams, X-rays or vacuum-ultraviolet rays, and therefore is useful for fluorescent lamps, cathode ray tubes, X-ray image converting apparatus or plasma display apparatus. It is particularly noteworthy that phosphor of the present invention shows an emission with higher luminance than the known cerium and terbium-activated $LaPO_4$ phosphor under excitation by ultraviolet rays or vacuum ultraviolet rays. Therefore, it is also useful, for example, as a green component of a 3- or 4-wavelength high color rendering lamp.

As will be shown in the Examples given hereinafter, the phosphor of the present invention is best from the viewpoint of luminance when Ln is Y, followed by Gd, La and Lu in this order. Therefore, the matrix of the phosphor of the present invention is preferably composed of a solid solution of Y or mainly Y with the rest being at least one of Gd, La and Lu. The molar ratio of Y in such a case is preferably selected within a range of from 0.7 to 1 mol, the rest of not higher than 0.3 mol being preferably selected in the order of Gd, La and Lu.

When used as various color emitting phosphors for fluorescent layers of high color rendering fluorescent lamps, the phosphors of the present invention satisfy the following various properties.

1) The blue-emitting phosphor has the main emission wavelength within a range of from 400 to 460 nm, preferably at around 450 nm, the green-emitting phosphor has the main emission wavelength within a range of from 510 to 560 nm, preferably at around 540 nm, and the red-emitting phosphor has the main emission wavelength within a range of from 600 to 640 nm, preferably at around 610 nm. Further, the bluish green-emitting phosphor has the main emission wavelength within a range of from 460 to 490 nm, preferably at around 480 nm.

2) The emission luminance is high.

3) The deterioration of the emission luminance i.e. the reduction with time of the emission luminance, is little.

Further, the phosphors of the present invention may be applied to certain specific colors and may be used in combination with the following conventional phosphors for fluorescent layers of high color rendering lamps. As a conventional blue-emitting phosphor, a bivalent europium-activated barium.magnesium aluminate phosphor (hereinafter referred to simply as a BAM.$Eu^{2+}$ phosphor) or alkaline earth halophosphate phosphor, is used. As a green-emitting phosphor, a cerium.terbium-activated lanthanum phosphate phosphor or magnesium aluminate phosphor, is used. As a red-emitting phosphor, a trivalent europium-activated yttrium oxide phosphor is used. As a bluish green-emitting phosphor, a bivalent europium-activated alkaline earth aluminate phosphor, alkaline earth halophosphate phosphor or alkaline earth haloborate phosphor, is used.

Now, the present invention will be described in further detail with reference to Examples. However, it should be understood that the present invention is by no means restricted by such specific Examples.

In the following Examples, the relative luminance of each phosphor was conducted by measuring the powder luminance under ultraviolet rays having a wavelength of 253.7 nm.

EXAMPLES 1 TO 3

Coprecipitated oxides of Y or Gd and Tb as the Y or Gd source and the Tb source, and $(NH_4)_2HPO_4$ as the phosphoric acid source, were weighed to bring the stoichiometrically composition of the mixture to the prescribed formula, and 10% by weight of ammonium chloride was added thereto as a flux. The mixture was thoroughly mixed, and the powder mixture was then put in an alumina crucible and fired in air at 500° C. for 2 hours. After cooling to room temperature, the fired product was pulverized and then put in an alumina crucible again and fired in a reducing atmosphere at 1,400° C. for 2 hours, followed by prescribed treatment to obtain a phosphor as identified in Table 1 as Examples 1 to 3. For the purpose of comparison, a $LaPO_4$:Ce,Tb phosphor was prepared in the same manner (Comparative Example).

With respect to the phosphors thus obtained, the relative luminance was measured. The results are shown in Table 1.

As is evident from Table 1, the properties are generally improved over the $LaPO_4$:Ce,Tb phosphor. Further, the emission spectrum of $(Y_{0.9}Tb_{0.1})_3PO_7$ is shown in FIG. 1.

EXAMPLES 4 TO 8

Coprecipitated oxides of Y and Eu, Sm, Tm, Dy or Pr as the Y source and the Eu, Sm, Tm, Dy or Pr source and $(NH_4)_2HPO_4$ as the phosphoric acid source, were weighed to bring the composition of the mixture to the stoichiometrically prescribed formula, and the phosphors as identified in Examples 4 to 8 in Table 1 were prepared in the same manner as in Examples 1 to 3, and their properties were measured.

As shown in FIGS. 2 to 5, excellent bright emissions specific to the respective rare earth elements are obtainable.

EXAMPLES 9 TO 11

As the Mg source, $MgCl_2 \cdot 6H_2O$ was weighed to bring the composition of the mixture to the stoichiometrically prescribed formula, and the phosphors as identified in Examples 9 to 11 in Table 1 were prepared in the same manner as in Examples 1 to 3, and their properties were measured. As a result, an excellent emission spectrum substantially the same as shown in FIG. 1, was obtained.

TABLE 1

Figure 2:
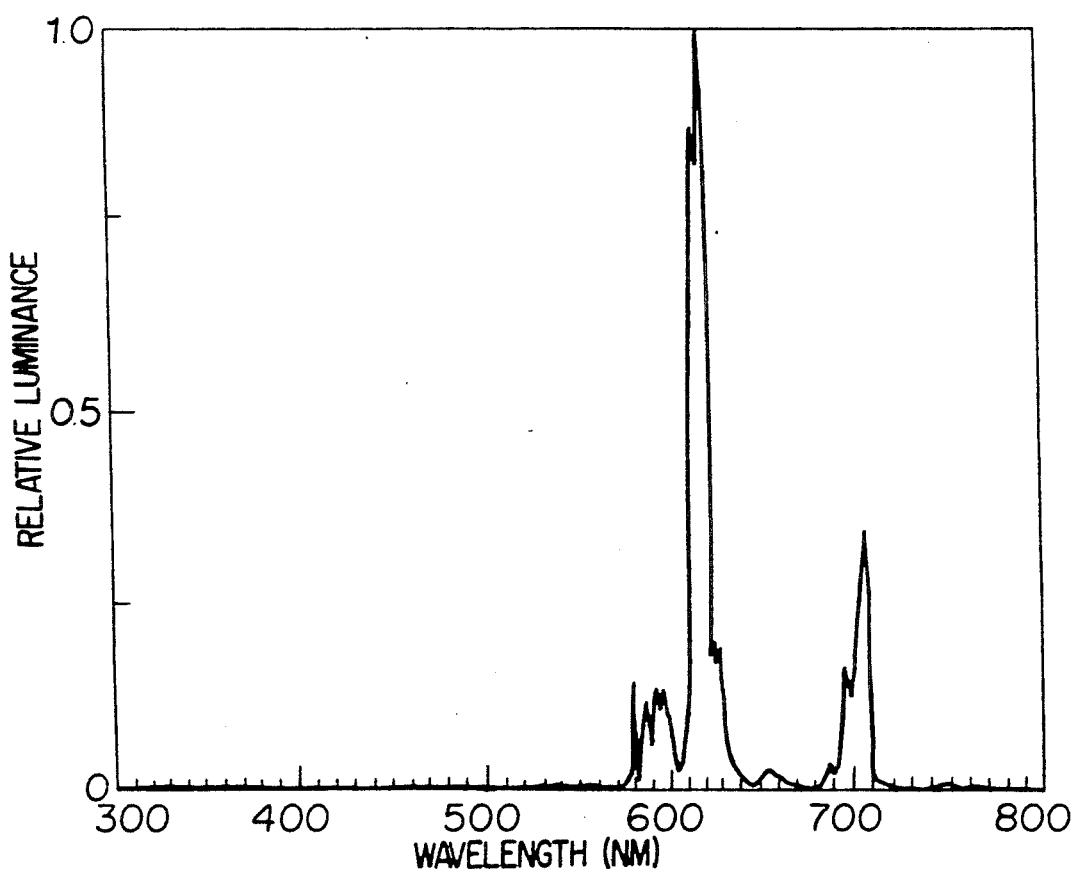
FIGS. 2 to 5 are the emission spectra of phosphors of the present invention wherein Y$_3$PO$_7$ is used as the phosphor matrix and europium, samarium, thulium and dysprosium are, respectively, used as activators (Examples 4, 5, 6 and 7, respectively).
Figure 3:
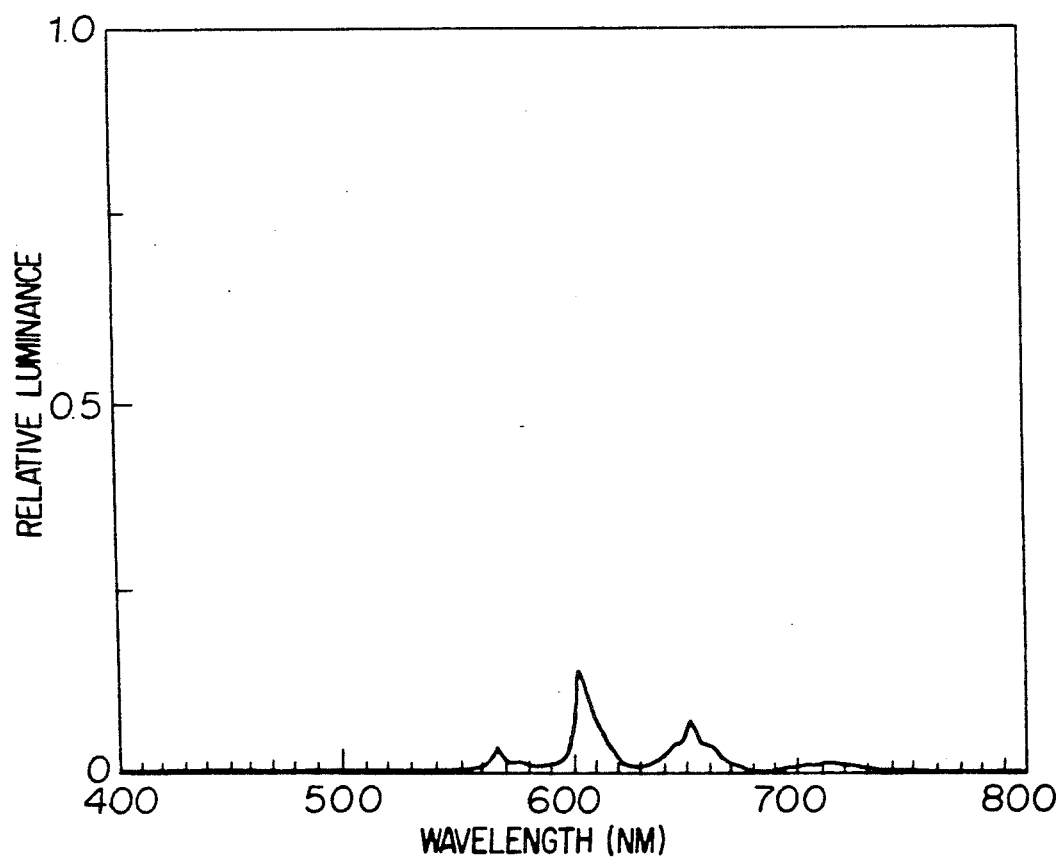
Figure 4:
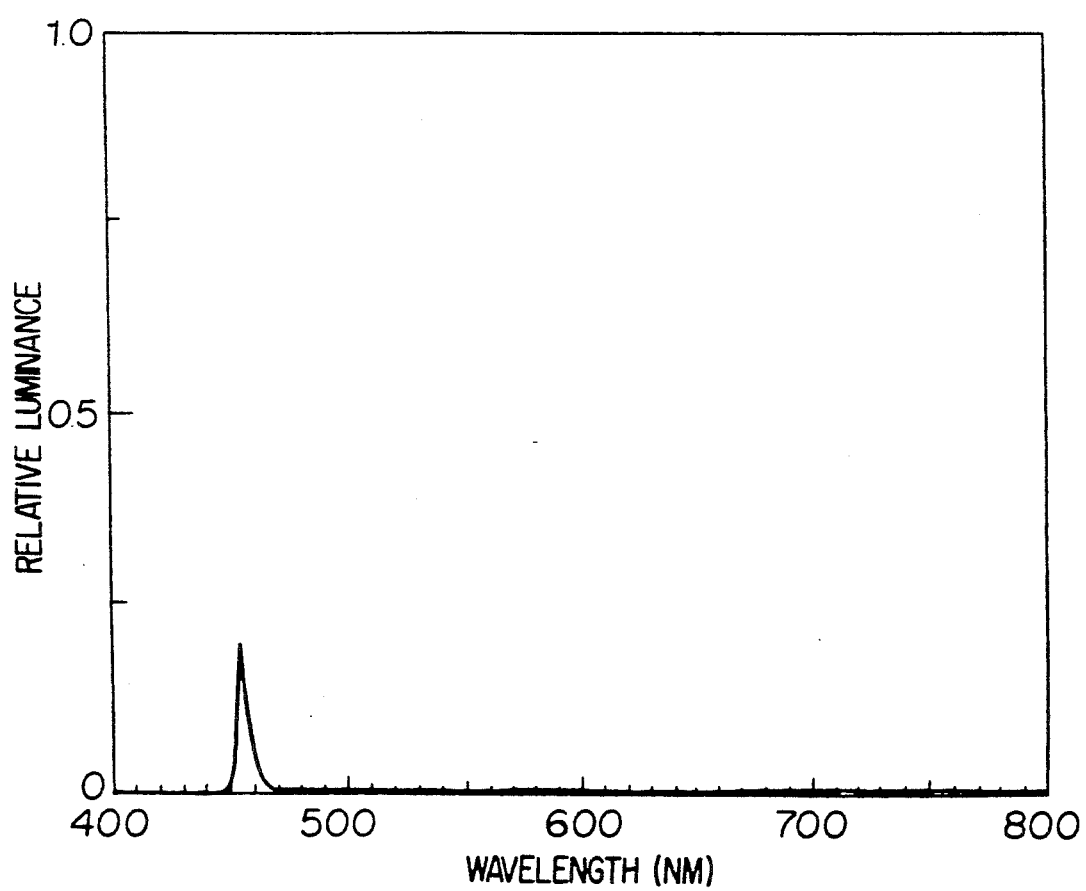
Figure 5:
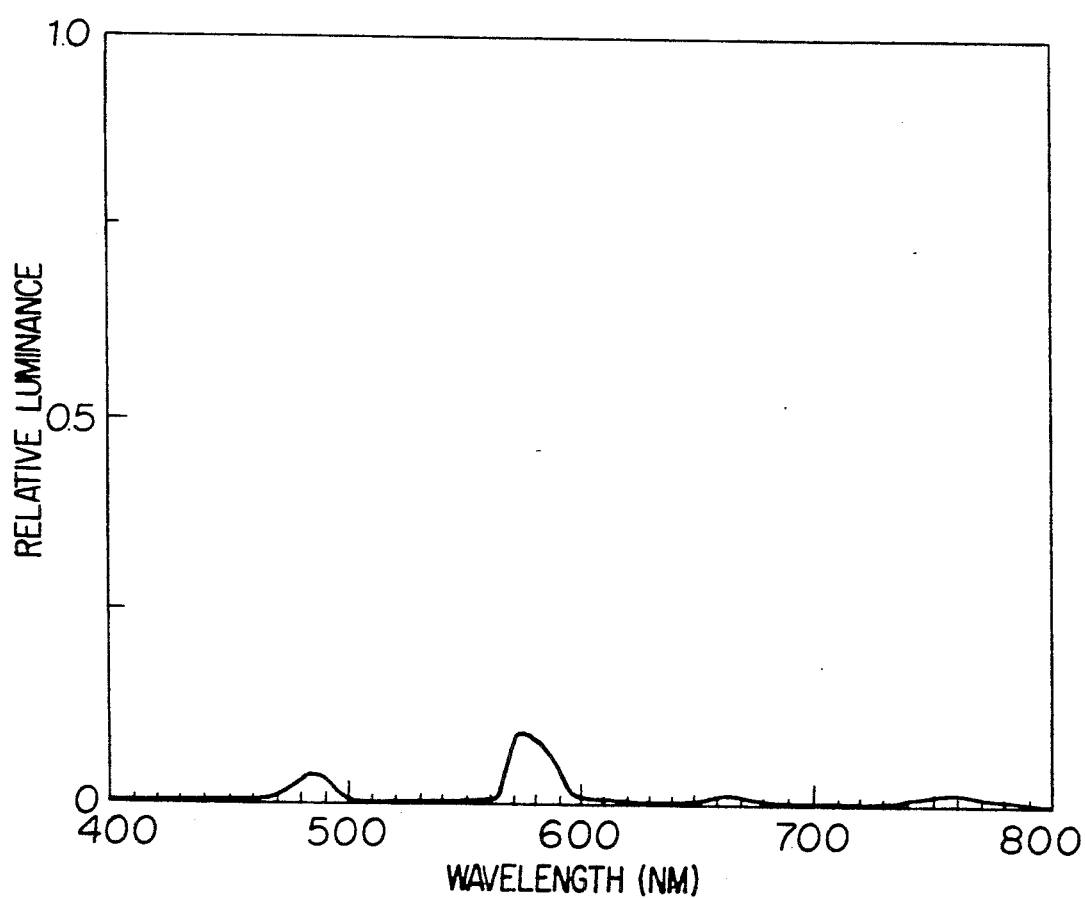

| | Composition | Relative luminance (%) | Reference |
|---|---|---|---|
| Example 1 | $(Y_{0.9}Tb_{0.1})_3PO_7$ | 110 | FIG. 1 |
| Example 2 | $(Gd_{0.9}Tb_{0.1})_3PO_7$ | 102 | |
| Example 3 | $(Y_{0.8}Gd_{0.1}Tb_{0.1})_3PO_7$ | 105 | |
| Comparative Example | $LaPO_4$:Ce,Tb | 100 | |
| | | Emitted color | |
| Example 4 | $(Y_{0.9}Eu_{0.1})_3PO_7$ | Red | FIG. 2 |
| Example 5 | $(Y_{0.99}Sm_{0.01})_3PO_7$ | Red | FIG. 3 |
| Example 6 | $(Y_{0.995}Tm_{0.005})_3PO_7$ | Blue | FIG. 4 |
| Example 7 | $(Y_{0.99}Dy_{0.01})_3PO_7$ | White | FIG. 5 |
| Example 8 | $(Y_{0.99}Pr_{0.01})_3PO_7$ | Orange | |
| | | Relative luminance (%) | |
| Example 9 | $(Y_{0.875}Tb_{0.125})_3PO_7 \cdot 0.2Mg_3(PO_4)_2$ | 111 | FIG. 1 |
| Example 10 | $(Y_{0.875}Tb_{0.125})_3PO_7 \cdot 0.3Mg_3(PO_4)_2$ | 109 | |
| Example 11 | $(Y_{0.825}La_{0.05}Tb_{0.125})_3PO_7 \cdot 0.1Mg_3(PO_4)_2$ | 104 | |
| Comparative Example | $LaPO_4$:Ce,Tb | 100 | |

The trivalent metal phosphate phosphor of the present invention is a novel $Ln_3PO_7$ type phosphor, whereby a remarkably high luminance is obtainable as compared with conventional phosphors.

We claim:

1. A trivalent metal phosphate phosphor having a composition of the formula: $(Ln_{1-x}Tb_x)_3PO_7$, wherein Ln is yttrium or a solid solution of yttrium and at least one of gadolinium, lanthanum and lutetium wherein the molar ratio of yttrium is within the range of 0.7 to 1 mol and the molar ratio of gadolinium, lanthanum and lutetium is not higher than 0.3 mol and x is a number which satisfies the relationship: $0.0001 \leq x \leq 0.5$.

2. The phosphor of claim 1, wherein x is a number which satisfies the relationship: $0.005 \leq x \leq 0.3$.

3. A trivalent metal phosphate phosphor having a composition of the formula: $(Ln_{1-x}Tb_x)_3PO_7 \cdot aMg_3(PO_4)_2$ wherein Ln is yttrium or a solid solution of yttrium and at least one of gadolinium, lanthanum and lutetium wherein the molar ratio of yttrium is within the range of 0.7 to 1 mol and the molar ratio of gadolinium, lanthanum and lutetium is not higher than 0.3 mol, x is a number which satisfies the relationship $0.0001 \leq x \leq 0.5$ and a is a number which satisfies the relationship $0 < a \leq 1$.

* * * * *

UNITED STATES PATENT AND TRADEMARK OFFICE
CERTIFICATE OF CORRECTION

PATENT NO. : 5,156,764

DATED : October 20, 1992

INVENTOR(S) : Hideaki Kaneda et al.

It is certified that error appears in the above-identified patent and that said Letters Patent is hereby corrected as shown below:

On Title page, Item [63], Related U.S. Application Data, is incorrect.

Please correct to read as follows: --Continuation of Ser. No. 458,402, Dec. 28, 1989, abandoned--.

Signed and Sealed this

Twenty-eighth Day of September, 1993

Attest:

BRUCE LEHMAN

Attesting Officer         Commissioner of Patents and Trademarks